US009816306B2

(12) United States Patent
Ikeda et al.

(10) Patent No.: US 9,816,306 B2
(45) Date of Patent: Nov. 14, 2017

(54) OPENING/CLOSING BODY CONTROL DEVICE AND OPENING/CLOSING BODY CONTROL METHOD

(71) Applicant: Mitsuba Corporation, Gunma (JP)

(72) Inventors: Takayuki Ikeda, Kiryu (JP); Masahiro Fueki, Kiryu (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 29 days.

(21) Appl. No.: 15/038,150

(22) PCT Filed: Dec. 17, 2014

(86) PCT No.: PCT/JP2014/083371
§ 371 (c)(1),
(2) Date: May 20, 2016

(87) PCT Pub. No.: WO2015/093514
PCT Pub. Date: Jun. 25, 2015

(65) Prior Publication Data
US 2016/0290028 A1 Oct. 6, 2016

(30) Foreign Application Priority Data
Dec. 19, 2013 (JP) ................. 2013-262860

(51) Int. Cl.
H02P 25/03 (2016.01)
E05F 15/659 (2015.01)
(Continued)

(52) U.S. Cl.
CPC ............ E05F 15/659 (2015.01); B60J 5/047 (2013.01); E05F 15/40 (2015.01); E05F 15/41 (2015.01);
(Continued)

(58) Field of Classification Search
USPC ....... 318/264–266, 272, 275, 277, 282, 286, 318/466–469, 626, 162–164
See application file for complete search history.

(56) References Cited

U.S. PATENT DOCUMENTS 7,812,554 B2* 10/2010 Takahashi ............... E05F 15/41
318/266
8,655,555 B2* 2/2014 Ono ........................ E05F 15/70
318/632

(Continued)

FOREIGN PATENT DOCUMENTS

CN 103124827 A 5/2013
JP 11311057 11/1999

(Continued)

OTHER PUBLICATIONS

Japanese Patent Office, International Search Report issued in International Patent Application No. PCT/JP2014/083371 and English-language Translation dated Feb. 24, 2015.

(Continued)

Primary Examiner — Bentsu Ro
(74) Attorney, Agent, or Firm — Wood Herron & Evans LLP

(57) ABSTRACT

In an opening/closing body control device, catching determination part (15) determines whether or not a catching in an opening/closing body has occurred based on a value of current that flows in a motor; a plurality of sensors (51 to 53) disposed to be shifted by predetermined electrical angles detect positions of magnetic poles of the motor (40); a counterclockwise pattern storage unit (14) stores a counterclockwise pattern which is a pattern corresponding to outputs of the plurality of sensors (51 to 53) and a predetermined shift in the electrical angles; and drive command part (16) controls the drive circuit (30) using a clockwise pattern or the counterclockwise pattern based on the outputs of the (Continued)

plurality of sensors (51 to 53), and in a case where the catching determination part (15) determines that a catching has occurred, controlling the drive circuit (30) in a predetermined pattern for eliminating the catching.

17 Claims, 6 Drawing Sheets

(51) Int. Cl.
| | | |
|---|---|---|
| *H02H 7/085* | (2006.01) | |
| *E05F 15/41* | (2015.01) | |
| *F16P 3/00* | (2006.01) | |
| *E05F 15/40* | (2015.01) | |
| *B60J 5/04* | (2006.01) | |
| *G05B 9/02* | (2006.01) | |
| *H02P 29/024* | (2016.01) | |
| *E05F 15/632* | (2015.01) | |

(52) U.S. Cl.
CPC .............. *F16P 3/00* (2013.01); *G05B 9/02* (2013.01); *H02H 7/085* (2013.01); *H02P 25/03* (2016.02); *H02P 29/024* (2013.01); *H02P 29/0241* (2016.02); *E05F 15/632* (2015.01); *E05Y 2201/438* (2013.01); *E05Y 2201/442* (2013.01); *E05Y 2400/40* (2013.01); *E05Y 2400/44* (2013.01); *E05Y 2900/531* (2013.01)

(56) References Cited

U.S. PATENT DOCUMENTS

| | | | | |
|---|---|---|---|---|
| 2008/0110092 A1* | 5/2008 | Takahashi | ............ | E05F 15/695 |
| | | | | 49/28 |
| 2009/0121664 A1* | 5/2009 | Sugimoto | ............ | E05F 15/697 |
| | | | | 318/400.09 |
| 2012/0209477 A1* | 8/2012 | Ono | ................ | E05F 15/70 |
| | | | | 701/49 |

FOREIGN PATENT DOCUMENTS

| | | | |
|---|---|---|---|
| JP | 2003274623 A | | 9/2003 |
| JP | 2006022512 A | | 1/2006 |
| JP | 3798939 B | | 7/2006 |
| JP | 2010090654 A | | 4/2010 |
| JP | 4734716 B | | 7/2011 |
| JP | 2013217068 A | | 10/2013 |
| WO | 2013157542 A1 | | 10/2013 |

OTHER PUBLICATIONS

Chinese Patent Office, Office Action issued in Chinese Patent Application No. 201480068606.7 dated Dec. 28, 2016, 18 pages.

* cited by examiner

OPENING/CLOSING BODY CONTROL DEVICE AND OPENING/CLOSING BODY CONTROL METHOD

TECHNICAL FIELD

The present invention relates to an opening/closing body control device which is appropriately used when an opening/closing body such as a sliding door is controlled, and an opening/closing body control method.

Priority is claimed on Japanese Patent Application No. 2013-262860, filed Dec. 19, 2013, the content of which is incorporated herein by reference.

BACKGROUND ART

In Patent Literature 1, an example of the configuration of a sliding door unit configured to open and close a door for a vehicle or the like by sliding the door is described. In Patent Literature 1, it is described that a brushless motor is appropriate as the power generation source of the sliding door unit because it facilitates a reduction in thickness, detection of a rotation frequency using sensors for magnetic pole detection, and the like (Patent Literature 1).

For example, the brushless motor includes a permanent magnet rotor having a plurality of magnetic poles and a stator having stator coils as an armature winding, and includes a plurality of sensors configured to detect the positions of the magnetic poles. In addition, the rotor is rotated by switching the energization of the stator coils on based on the outputs of the plurality of sensors, such that driving characteristics similar to those of a brush motor are obtained without brushes.

CITATION LIST

Patent Literature

[Patent Literature 1] Japanese Patent Application, Publication No. 2010-90654

SUMMARY OF INVENTION

Technical Problem

In the brushless motor, switching of current that flows through the stator coil is controlled on based on the outputs of the plurality of sensors. Therefore, for example, when a change in speed or a change in load occurs, there may be cases where there is an offset between the switching timing of the outputs of the sensors and an optimal switching timing of the energization state of the stator coil. Particularly, in a case of use in the vicinity of a lock current (in the vicinity of the maximum current that occurs when the rotational speed becomes zero due to an excessive load torque), there may be cases where relatively large rotation unevenness occurs in the motor. Due to the rotation unevenness, current unevenness occurs.

On the other hand, in the sliding door unit, catching detection is performed in which getting caught of a person or an object during opening and closing of the door. For example, catching detection may be performed based on a change in motor current. However, in the case of using the brushless motor, the occurrence of current unevenness in the vicinity of the lock current is a problem when the catching detection is performed with higher accuracy.

The present invention provides an opening/closing body control device and an opening/closing body control method capable of further enhancing the accuracy of detection in a case where catching detection is performed based on motor current.

Solution to Problem

According to a first aspect of the present invention, an opening/closing body control device controls driving of opening and closing of an opening/closing body using a motor. The opening/closing body control device includes: catching determination part configured to determine whether or not a catching in the opening/closing body has occurred based on a value of current that flows in the motor; a plurality of sensors which are disposed to be shifted by predetermined electrical angles and are configured to detect positions of magnetic poles of the motor; a drive circuit configured to switch an energization state of the motor; rotational direction deciding part configured to generate a rotational direction signal indicating clockwise rotation or counterclockwise rotation of the motor; a clockwise pattern storage unit which stores a clockwise pattern which is a switching pattern for switching an energization state of the drive circuit according to outputs of the plurality of sensors and which is used when the motor is rotated clockwise; a counterclockwise pattern storage unit which stores a counterclockwise pattern which is a switching pattern for switching the energization state of the drive circuit according to the outputs of the plurality of sensors and a predetermined shift in the electrical angles and which is used when the motor is rotated counterclockwise; switching part configured to read either the clockwise pattern or the counterclockwise pattern from the clockwise pattern storage unit or the counterclockwise pattern storage unit based on the rotational direction signal, being output from the rotational direction deciding part; and drive command part configured to control the drive circuit using the clockwise pattern or the counterclockwise pattern output from the switching part based on the outputs of the plurality of sensors, and in a case where the catching determination part determines that a catching has occurred, controlling the drive circuit in a predetermined pattern for eliminating the catching.

According to a second aspect of the present invention, in the opening/closing body control device, the motor is a brushless motor provided with a permanent magnet rotor having a plurality of magnetic poles and a stator having stator coils as multi-phase armature windings.

According to a third aspect of the present invention, in the opening/closing body control device, the predetermined electrical angles by which the plurality of sensors disposed to be shifted are set with respect to a center of the stator coils included in the motor as a basis.

According to a fourth aspect of the present invention, in the opening/closing body control device, the motor is a brushless motor with 16 poles and 18 slots. 18 coils are wound in each of the slots as concentrated windings, and a single phase group is formed of three adjacent coils, and the center of the stator coils is positioned in the middle of a single phase group formed of three adjacent coils.

According to a fifth aspect of the present invention, in the opening/closing body control device, the plurality of sensors are disposed in a range of a mechanical angle of 30 degrees.

According to a sixth aspect of the present invention, in the opening/closing body control device, the predetermined shift in the electrical angles is set to a value that reduces pulsation of the motor under a high load.

According to a seventh aspect of the present invention, an opening/closing body control method is an opening/closing body control method of controlling driving of opening and closing of an opening/closing body using a motor. The opening/closing body control method uses catching determination part configured to determine whether or not a catching in the opening/closing body has occurred based on a value of current that flows in the motor, a plurality of sensors which are disposed to be shifted by predetermined electrical angles and are configured to detect positions of magnetic poles of the motor, a drive circuit configured to switch an energization state of the motor, rotational direction deciding part configured to generate a rotational direction signal indicating clockwise rotation or counterclockwise rotation of the motor, a clockwise pattern storage unit which stores a clockwise pattern which is a switching pattern for switching an energization state of the drive circuit according to outputs of the plurality of sensors and which is used when the motor is rotated clockwise, a counterclockwise pattern storage unit which stores a counterclockwise pattern which is a switching pattern for switching the energization state of the drive circuit according to the outputs of the plurality of sensors and a predetermined shift in the electrical angles and which is used when the motor is rotated counterclockwise, and switching part configured to read either the clockwise pattern or the counterclockwise pattern from the clockwise pattern storage unit or the counterclockwise pattern storage unit based on the rotational direction signal, being output from the rotational direction deciding part. According to the opening/closing body control method, the drive circuit is controlled using the clockwise pattern or the counterclockwise pattern output from the switching part based on the outputs of the plurality of sensors, and in a case where the catching determination part determines that a catching has occurred, the drive circuit is controlled in a predetermined pattern for eliminating the catching.

Advantageous Effects of Invention

According to the opening/closing body control device and the opening/closing body control method described above, the plurality of sensors are disposed to be shifted by predetermined electrical angles, and the energization state of the motor during counterclockwise rotation is controlled by using the counterclockwise pattern corresponding to the outputs of the plurality of sensors and a predetermined shift in the electrical angles. For example, if the shift in the electrical angles is set to reduce current unevenness in the vicinity of lock current as much as possible, current unevenness in the vicinity of the lock current can be reduced. Therefore, in this case, catching detection in the vicinity of the lock current can be performed with higher accuracy.

DESCRIPTION OF EMBODIMENTS

Figure 1:
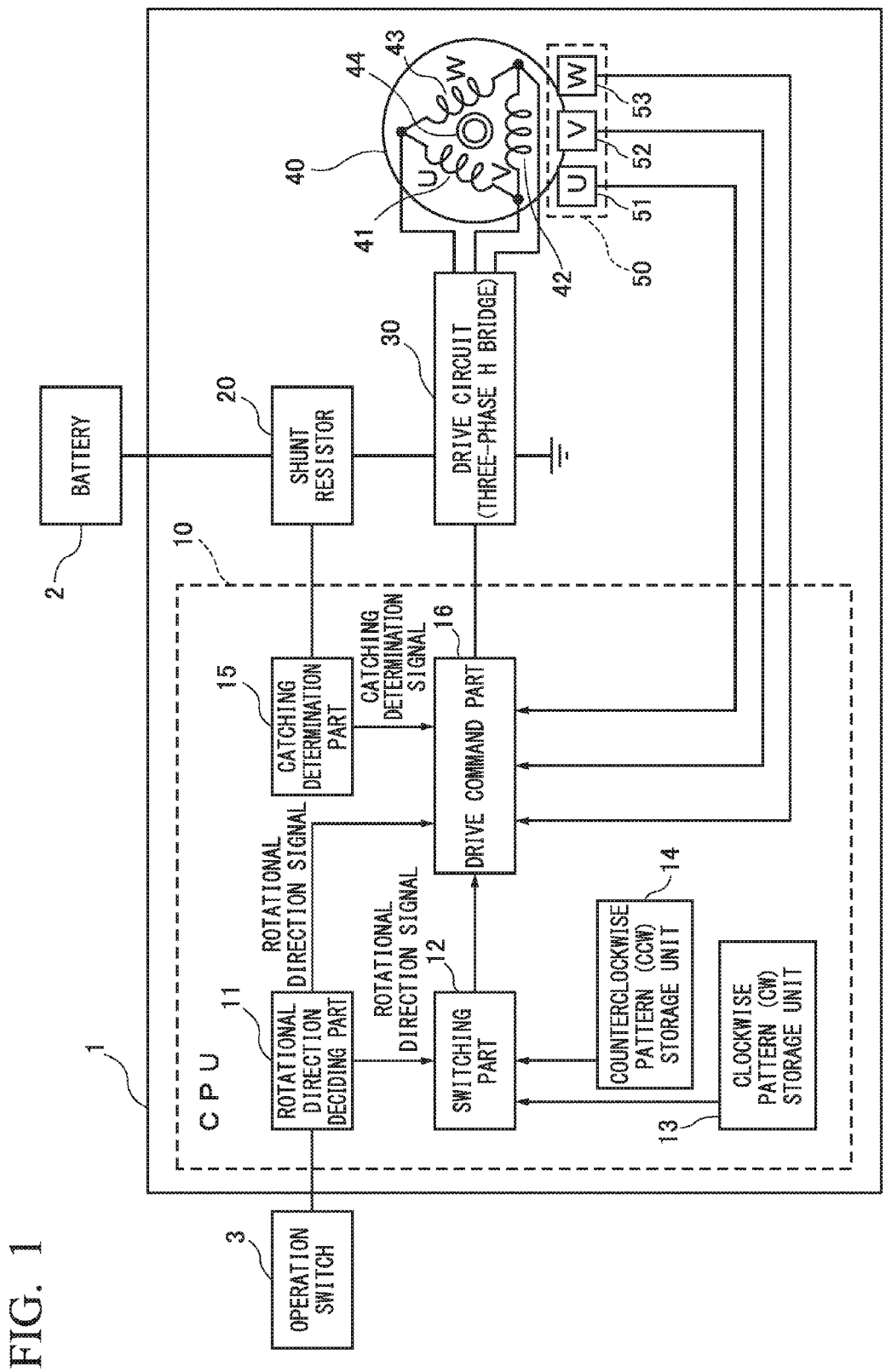
FIG. 1 is a block diagram showing an example of the configuration of an embodiment of an opening/closing body control device of the present invention.

Hereinafter, an embodiment of the present invention will be described with reference to the drawings. FIG. 1 is a block diagram showing an example of the configuration of an opening/closing body control device 1 which is an embodiment of the present invention. The opening/closing body control device 1 shown in FIG. 1 is a device which controls driving of opening and closing of an opening/closing body such as a sliding door using a motor (power sliding door) mounted on a vehicle. A battery 2 and an operation switch 3 are connected to the opening/closing body control device 1. For example, the battery 2 is a 12 V DC secondary battery. In addition, the operation switch 3 is an operation switch of a power sliding door operated by a user, and transmits an operation signal indicating an opening operation or a closing operation generated in response to operating the operation switch to a central processing unit (CPU) 10 of the opening/closing body control device 1.

The opening/closing body control device 1 includes the CPU 10, a shunt resistor 20, a drive circuit 30, a motor 40, and a sensor group 50. The shunt resistor 20 generates a voltage corresponding to current that flows through the motor 40. The drive circuit 30 is configured as a three-phase H bridge (also called an inverter). The drive circuit 30 is controlled by the CPU 10. The drive circuit 30 receives a DC output of the battery 2 via the shunt resistor 20 and supplies the output to the motor 40. The motor 40 is a brushless motor. The motor 40 includes a stator having a U-phase stator coil 41, a V-phase stator coil 42, and a W-phase stator coil 43 wound as three-phase armature windings in a delta connection, and a permanent magnet rotor 44 having a plurality of magnetic poles. The sensor group 50 which include magnetic pole position detection sensors configured using Hall elements or the like is attached to the motor 40 in the vicinity of the permanent magnet rotor 44. The sensor group 50 includes three sensors including a sensor U51, a sensor V52, and a sensor W53, which detect the positions of the magnetic poles of the motor 40. The three sensors are disposed to be shifted by predetermined electrical angles. The sensor U51, the sensor V52, and the sensor W53 detect switching between the magnetic poles of the permanent magnet rotor 44 and output the detection results as binary signals of high or low. In this embodiment, the sensors U51 to W53 are installed at positions adjusted with an advance angle for clockwise rotation (that is, positions shifted by predetermined electrical angles), which will be described later.

The CPU 10 includes rotational direction determination part 11, switching part 12, a clockwise (CW) pattern storage unit 13, a counterclockwise (CCW) pattern storage unit 14, catching determination part 15, and drive command part 16. Here, the CPU 10 includes, as well as an arithmetic device and a control device, volatile and non-volatile storage devices, an input/output device, an analog/digital (A/D) conversion device, a counter, a clock generation circuit, a register circuit, and the like. Here, the CPU 10 executes processes of each of the rotational direction determination part 11, the switching part 12, the catching determination part 15, and the drive command part 16 by executing programs stored in the non-volatile storage device.

The rotational direction deciding part 11 decides whether to rotate the motor 40 clockwise or counterclockwise according to the operation signal output from the operation switch 3, generates a rotational direction signal which is a signal indicating a rotational direction, and output the signal. The switching part 12 reads either a clockwise pattern or a counterclockwise pattern from a clockwise pattern storage unit 13 or a counterclockwise pattern storage unit 14 based on the rotational direction signal, being output from the rotational direction deciding part 11.

Figure 2:
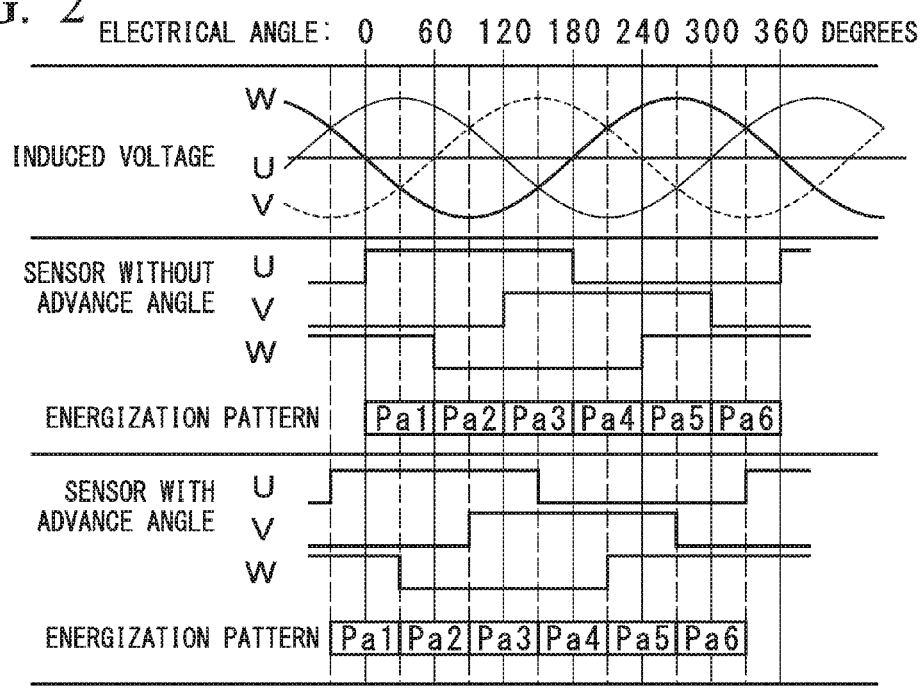
FIG. 2 is an explanatory view showing energization patterns during clockwise rotation of a motor 40 shown in FIG. 1.

The clockwise pattern storage unit 13 stores the clockwise pattern, which is a switching pattern of the energization state of the drive circuit 30 corresponding to the outputs of the plurality of sensors U51 to W53 and which is a switching pattern of the motor 40 during clockwise rotation. Here, the clockwise pattern stored in the clockwise pattern storage unit 13 will be described with reference to FIG. 2. FIG. 2 is a view showing the correspondence relationship between electrical angles, induced voltages in the stator coils 41 to 43, the output waveforms of the sensors U51 to W53, and an energization patterns Pa1 to Pa6 corresponding to the output waveforms of the sensors U51 to W53, in two cases including a case without an advance angle and a case with an advance angle when the motor 40 is rotated clockwise. The clockwise pattern storage unit 13 stores the patterns of the output waveforms of the sensors U51 to W53 and the energization patterns Pa1 to Pa6 in the case with an advance angle, being associated with each other, as the clockwise pattern. That is, the clockwise pattern is information representing the correspondence between the patterns of the output waveforms of the sensors U51 to W53 and the energization pattern Pa1 to Pa6. Here, regarding the electrical angles, one cycle of a change in the positions of the magnetic poles (that is, a change in magnetic fields) is expressed as 360 degrees. In addition, "without an advance angle" refers to a case where the installation positions of the sensors U51 to W53 that detect the positions of the magnetic poles are set to typical positions (that is, positions at which there is no shift in the electrical angle). That is, the positions without an advance angle part that the sensors U51 to W53 are installed at positions at which, in a case where the outputs of the sensors U51 to W53 are changed, it is optimal to immediately switch the stator coils 41 to 43 to the energization state corresponding to the change. On the other hand, "with an advance angle" refers to a case where the installation positions of the sensors U51 to W53 that detect the positions of the magnetic poles are set to positions advanced by a predetermined electrical angle. In this embodiment, the advance angle of the electrical angle (that is, a predetermined shift in the electrical angle) is set to a value which reduces pulsation under a high load on the motor 40. For example, the advance angle of the electrical angle may be decided by an experiment or the like. In the motor 40 of this embodiment, the advance angle of the electrical angle is set to 30 degrees. Therefore, in the case with the advance angle, the outputs of the sensors U51 to W53 are changed earlier by an electrical angle of 30 degrees than in the case without the advance angle.

Since the stator coils 41 to 43 are three-phase coils, the energization pattern is formed in one cycle of electrical angles including six different patterns Pa1 to Pa6 each corresponding to an electrical angle of 60 degrees. In the case without the advance angle, for example, when the sensor U51 is in a high level, the sensor V52 is in a low level, and the sensor W53 is in a high level, the pattern Pa1 is selected. In addition, in the pattern Pa1, both voltages of a high voltage side output and a low voltage side output are applied from the drive circuit 30 to both ends of the U-phase stator coil 41. In this case, the V-phase stator coil 42 and the W-phase stator coil 43 are in a state of being connected in series, and a voltage of half of the voltage applied to the U-phase stator coil 41 is applied thereto. On the other hand, with the advance angle, the correspondence relationship between the output patterns of the sensors U51 to W53 and the energization patterns Pa1 to Pa6 is the same as that in the case without the advance angle. With the advance angle, the outputs of the sensors U51 to W53 are changed earlier by an electrical angle of 30 degrees. Therefore, the energization patterns Pa1 to Pa6 are switched earlier by an electrical angle of 30 degrees than in the case without the advance angle.

Figure 3:
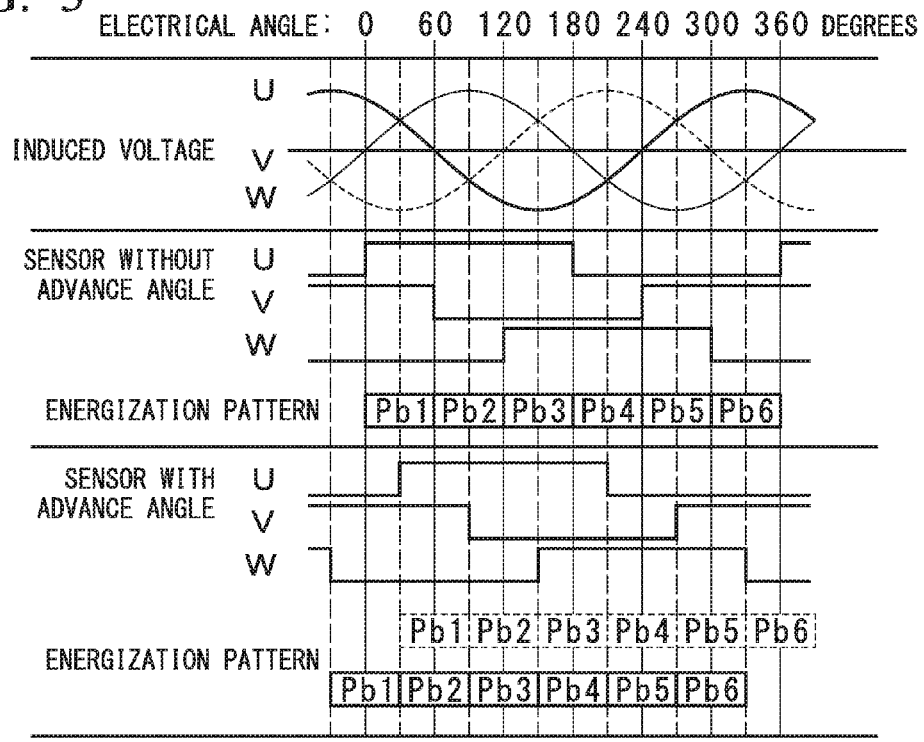
FIG. 3 is an explanatory view showing energization patterns during counterclockwise rotation of the motor 40 shown in FIG. 1.

Next, the counterclockwise pattern storage unit 14 stores the counterclockwise pattern, which is a pattern corresponding to the outputs of the plurality of sensors U51 to W53 and a predetermined advance angle of the electrical angle (here, becomes a delayed angle during counterclockwise rotation). And the counterclockwise pattern is a switching pattern of the energization state using the drive circuit 30 during counterclockwise rotation of the motor 40. Here, the counterclockwise pattern stored in the counterclockwise pattern storage unit 14 will be described with reference to FIG. 3. FIG. 3 is an explanatory view similar to FIG. 2, and is a view showing the correspondence relationship between electrical angles, induced voltages in the stator coils 41 to 43, the output waveforms of the sensors U51 to W53, and energization patterns Pb1 to Pb6 corresponding to the output waveforms of the sensors U51 to W53, in two cases including the case without an advance angle and the case with an advance angle when the motor 40 is rotated counterclockwise. The counterclockwise pattern storage unit 14 stores the patterns of the sensors U51 to W53 and the energization patterns Pb1 to Pb6 in the case with an advance angle, being associated with each other. In addition, the counterclockwise pattern is information representing the correspondence between the patterns of the sensors U51 to W53 and the energization patterns Pb1 to Pb6.

The sensors U51 to W53 of this embodiment are installed at the positions adjusted with the advance angle for clockwise rotation. Therefore, when the correspondence between the sensors U51 to W53 without the advance angle and the energization patterns Pb1 to Pb6 is used as it is, in a case where the sensors U51 to W53 with the advance angle are used, the energization patterns are inversely delayed by 30 degrees as indicated by broken lines. Here, by a correspondence different from the correspondence in the case without the advance angle, the outputs of the sensors U51 to W53 and the energization patterns Pb1 to Pb6 are made to correspond with each other.

For example, in the case without the advance angle, for example, when the sensor U51 is in a high level, the sensor V52 is in a high level, and the sensor W53 is in a low level, the pattern Pb1 is selected. Contrary to this, in the case with the advance angle, when the sensor U51 is in a low level, the sensor V52 is in a high level, and the sensor W53 is in a low level, the pattern Pb1 is selected. By changing the correspondence as described above (that is, with an advance by an electrical angle of 60 degrees), the energization patterns Pb1 to Pb6 are selected earlier by an electrical angle of 30 degrees than in the case without the advance angle even during counterclockwise rotation.

Next, the catching determination part 15 shown in FIG. 1 determines whether or not a catching in the opening/closing body such as a sliding door has occurred based on the value of the current that flows in the motor 40. That is, the catching determination part 15 acquires a voltage generated in the shunt resistor 20 by amplifying and performing A/D conversion thereon, and determines whether or not a catching has occurred based on the current value thereof. In addition, in a case where it is determined that a catching has occurred, the catching determination part 15 generates a catching determination signal indicating that the catching has occurred (or a signal directly instructing the motor 40 to stop driving), and outputs the signal to the drive command part 16. Regarding the determination of a catching, for example, in a case where a current change amount per predetermined time exceeds a predetermined threshold, it can be determined that the catching has occurred.

The drive command part 16 controls the drive circuit 30 using the clockwise pattern or the counterclockwise pattern output from the switching part 12 based on the outputs of the plurality of sensors 51 to 53 and the rotational direction signal output from the rotational direction deciding part 11 (here, the rotational direction signal may be omitted by using the clockwise pattern or the counterclockwise pattern). The drive command part 16 generates while changing according to time, a speed command value of the motor 40 according to the operation of the operation switch 3 according to a predetermined set value, and drives the drive circuit 30 in the clockwise pattern or the counterclockwise pattern while performing duty control thereon according to a deviation between the speed command value and the rotational speed of the motor 40 obtained from the outputs of the plurality of sensors 51 to 53. Furthermore, in a case where the catching determination part 15 determines that a catching has occurred, the drive command part 16 controls the drive circuit 30 in a predetermined pattern for eliminating the catching. Here, the predetermined pattern for eliminating the catching may be a pattern for performing counterclockwise rotation drive in a case where catching is determined while the motor 40 is driven to rotate clockwise, and may be a pattern for performing clockwise rotation drive in a case where a catching is determined while the motor 40 is driven to rotate counterclockwise. Otherwise, the pattern may also be a pattern for immediately stopping the motor 40, a pattern for stopping the motor 40 after performing counterclockwise rotation drive for a short period of time in case of a clockwise rotation state, a pattern for stopping the motor 40 after performing clockwise rotation drive for a short period of time in a case of a counterclockwise rotation state, or the like. The drive command part 16 controls the drive circuit 30 using the clockwise pattern or the counterclockwise pattern output from the switching part 12 based on the outputs of the plurality of sensors 51 to 53 and the rotational direction signal output from the rotational direction deciding part 11 (here, the rotational direction signal may be omitted by using the clockwise pattern or the counterclockwise pattern). The drive command part 16 generates while changing according to time, a speed command value of the motor 40 according to the operation of the operation switch 3 according to a predetermined set value, and drives the drive circuit 30 in the clockwise pattern or the counterclockwise pattern while performing duty control thereon according to a deviation between the speed command value and the rotational speed of the motor 40 obtained from the outputs of the plurality of sensors 51 to 53. Furthermore, in a case where the catching determination part 15 determines that a catching has occurred, the drive command part 16 controls the drive circuit 30 in a predetermined pattern for eliminating the catching. Here, the predetermined pattern for eliminating the catching may be a pattern for performing counterclockwise rotation drive in a case where catching is determined while the motor 40 is driven to rotate clockwise, and may be a pattern for performing clockwise rotation drive in a case where a catching is determined while the motor 40 is driven to rotate counterclockwise. Otherwise, the pattern may also be a pattern for immediately stopping the motor 40, a pattern for stopping the motor 40 after performing counterclockwise rotation drive for a short period of time in case of a clockwise rotation state, a pattern for stopping the motor 40 after performing clockwise rotation drive for a short period of time in a case of a counterclockwise rotation state, or the like.

Figure 4:
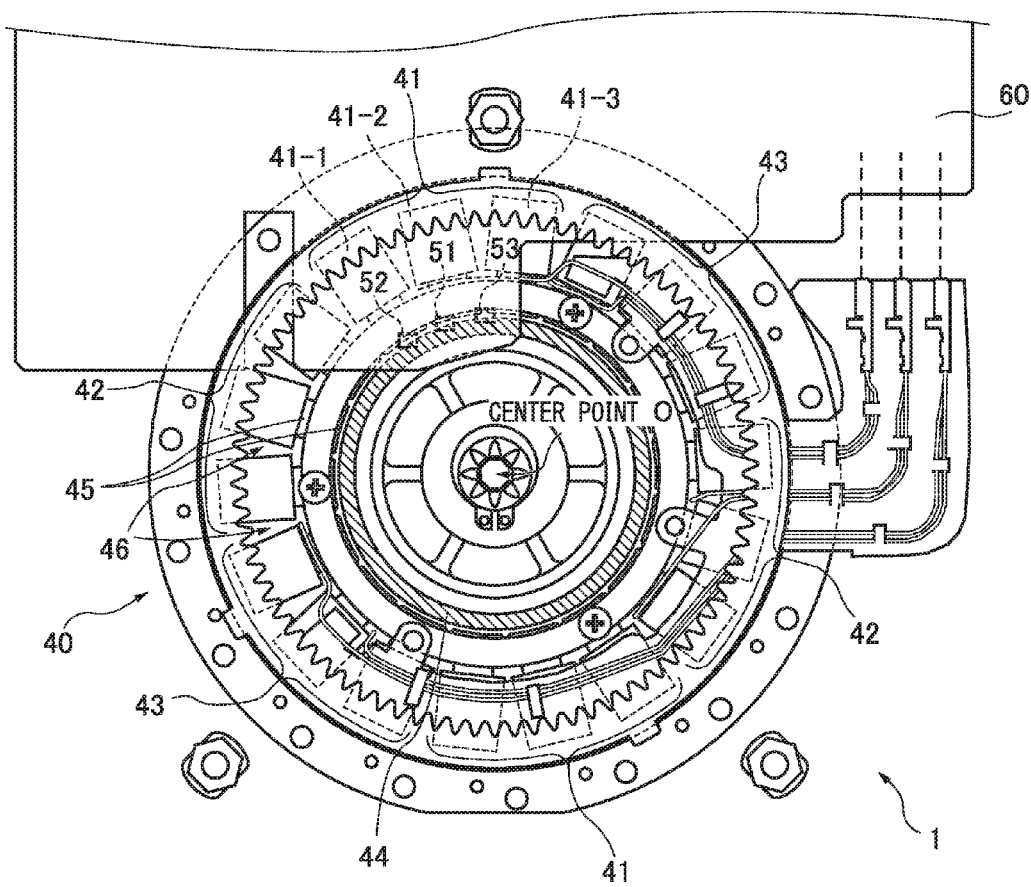
FIG. 4 is a plan view showing an example of the configuration of the appearance of the opening/closing body control device 1 shown in FIG. 1.

Next, an example of the configuration of the appearance of the opening/closing body control device 1 shown in FIG. 1 will be described with reference to FIG. 4. In FIG. 4, those configurations which are identical to the configurations shown in FIG. 1 are denoted by the same reference numerals. In the example shown in FIG. 4, the motor 40 is configured as a brushless motor with 16 poles and 18 slots. In this case, the permanent magnet rotor 44 which is shown by hatching is configured to have 16 poles for each magnetic pole of an N pole and an S pole. In addition, a stator 45 has 18 slots 46, and 18 stator coils 41-1 to 41-3 are wound in the slots 46 as concentrated windings. In addition, a substrate 60 is attached to the motor 40. On the substrate 60, as well as the sensors 51 to 53 shown in FIG. 4, the CPU 10, the shunt resistor 20, and the drive circuit 30 (which are not shown) are mounted.

The stator coils 41 to 43 shown in FIG. 4 form phase groups, each having three adjacent coils (for example, U-phase stator coils 41-1, 41-2, and 41-3), and the phase groups having the same phase are disposed at positions that oppose each other with respect to a center point O of the stator 45, thereby having a total of six phase groups. Here, the U-phase stator coil 41 and the opposing U-phase stator coil 41 are connected in series to form a single U-phase stator coil 41. In addition, regarding the coils in each phase group, for example, in the U-phase stator coils 41-1, 41-2, and 41-3, the U-phase stator coil 41-2 has a different winding direction from that of the other U-phase stator coils 41-1 and 41-3. Similarly, in the other V-phase stator coils 42 and the W-phase stator coils 43, the winding direction of the coil positioned in the middle of the phase group is different from the winding direction of the other coils.

Figure 5:
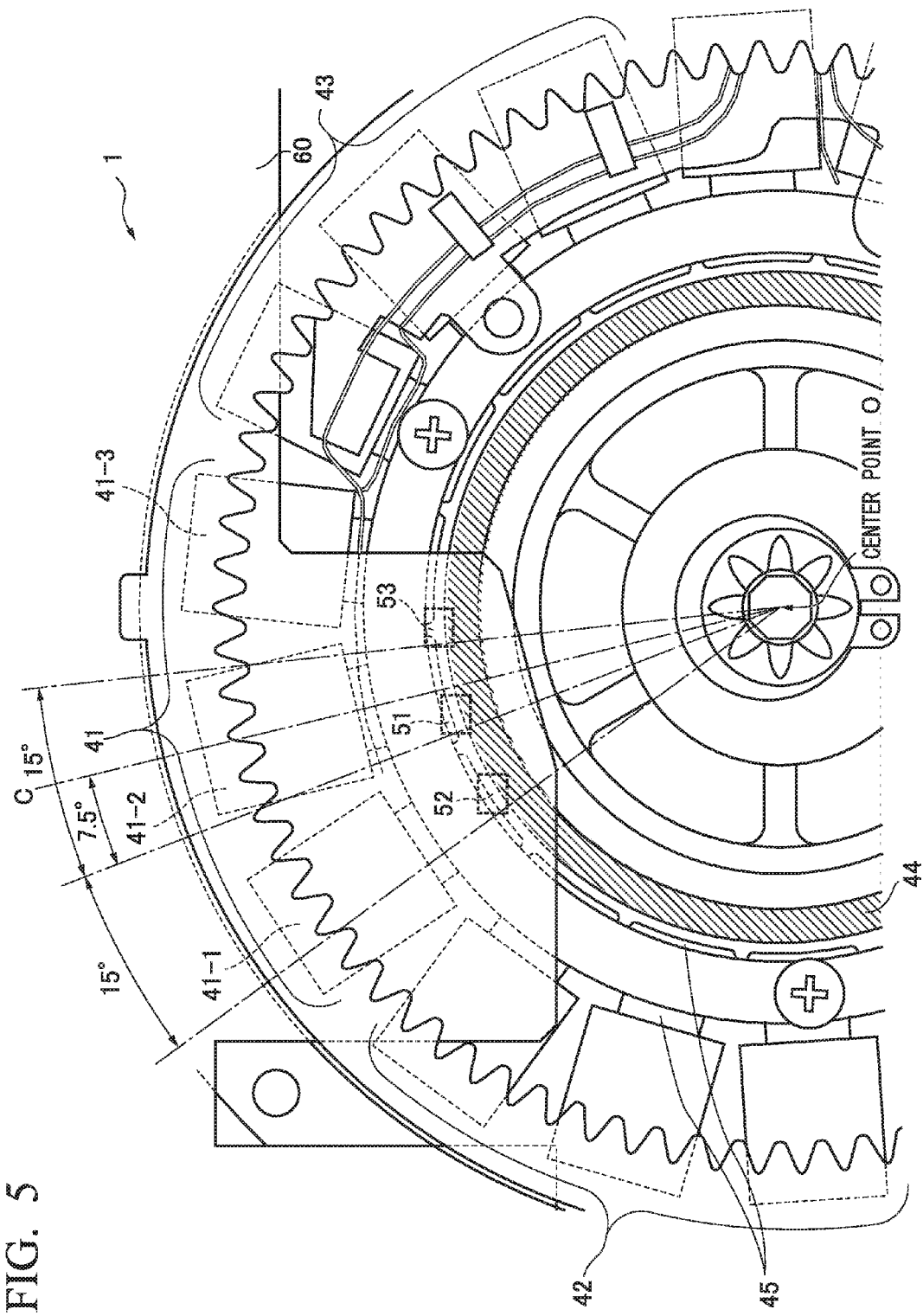
FIG. 5 is an explanatory view showing an example of the disposition of a sensor U51, a sensor V52, and a sensor W53 shown in FIG. 1.

Next, the installation positions of the sensors 51 to 53 will be described with reference to FIG. 5. FIG. 5 is an enlarged view of a portion of FIG. 4. As described with reference to FIG. 4, the motor 40, in which a single phase group is formed of three adjacent coils, has a total of six phase groups. Sensors configured to detect the positions of magnetic poles are generally disposed between the phase groups. As a single phase group of this case has a mechanical angle of 60 degrees (=360 degrees/6 (phase groups)), and thus the sensors 51 to 53 are supposed to be disposed every 60 degrees in a general disposition. However, in the disposition every 60 degrees, the three sensors 51 to 53 have a width of a mechanical angle of 120 degrees in total. Therefore, in the disposition every 60 degrees, there is a problem in terms of space saving. Here, in the example of the configuration shown in FIG. 5, the single sensor U51 is disposed in the intermediate portion of the phase group, and the positions of the other two sensors V52 and W53 are shifted, such that the three sensors 51 to 53 are disposed in a range of a mechanical angle of 30 degrees. That is, since the permanent magnet rotor 44 of the example of the configuration has 16 magnetic poles, the mechanical angle of each magnetic pole is 22.5 degrees (=360 degrees/16). Therefore, regarding the movement of the positions of both the N pole and the S pole by a mechanical angle of 45 degrees, the detected waveforms of the magnetic poles are equal to each other before and after the movement. Here, contrary to the range of a mechanical angle of 120 degrees for the three sensors 51 to 53, the position of the first sensor is used as the reference (that is, a mechanical angle of 0 degree), the position of the second sensor is shifted from a mechanical angle of 60 degrees by a mechanical angle of 45 degrees and is thus moved to a position at a mechanical angle of 15 degrees, and the position of the third sensor is shifted from a mechanical angle of 120 degrees by a mechanical angle of 90 degrees and is thus moved to a position at a mechanical angle of 30 degrees. Accordingly, the three sensors 51 to 53 are disposed in a range of a mechanical angle of 30 degrees. In this disposition, it becomes possible to densely dispose the three sensors 51 to 53 in a relatively narrow region on the substrate 60.

Next, a disposition regarding the adjustment of an advance angle will be described. In this embodiment, advance angle adjustment with an electrical angle of 30 degrees is performed. This corresponds to a mechanical angle of 3.75 degrees in the case of 16 poles. However, in this embodiment, since the stator coils 41 to 43 are in a delta connection, in a case where a single phase group is formed of three coils in the 18 slots, regarding the sensor 51 positioned in the intermediate portion, a position shifted by a mechanical angle of 3.75 degrees from the coil 41-2 of the intermediate portion becomes a position at an electrical angle of 0 degree. Therefore, a position shifted from the center C of the coil 41-2 of the intermediate portion by a mechanical angle of 7.5 degrees including a mechanical angle of 3.75 degrees as the advance angle and a mechanical angle shift of 3.75 degrees becomes a position advanced by an electrical angle of 30 degrees. With respect to the position of the sensor U51, the sensor V52 and the sensor W53 are respectively disposed at positions shifted by a mechanical angle of 15 degrees. Accordingly, the three sensors 51 to 53 are advanced by an electrical angle of 30 degrees and as a whole disposed in a range of a mechanical angle of 30 degrees. In addition, in a case where a star connection is employed instead of the delta connection, an angle from the center line C is a mechanical angle of 3.75 degrees (corresponding to an electrical angle of 30 degrees), not a mechanical angle of 7.5 degrees.

Figure 6:
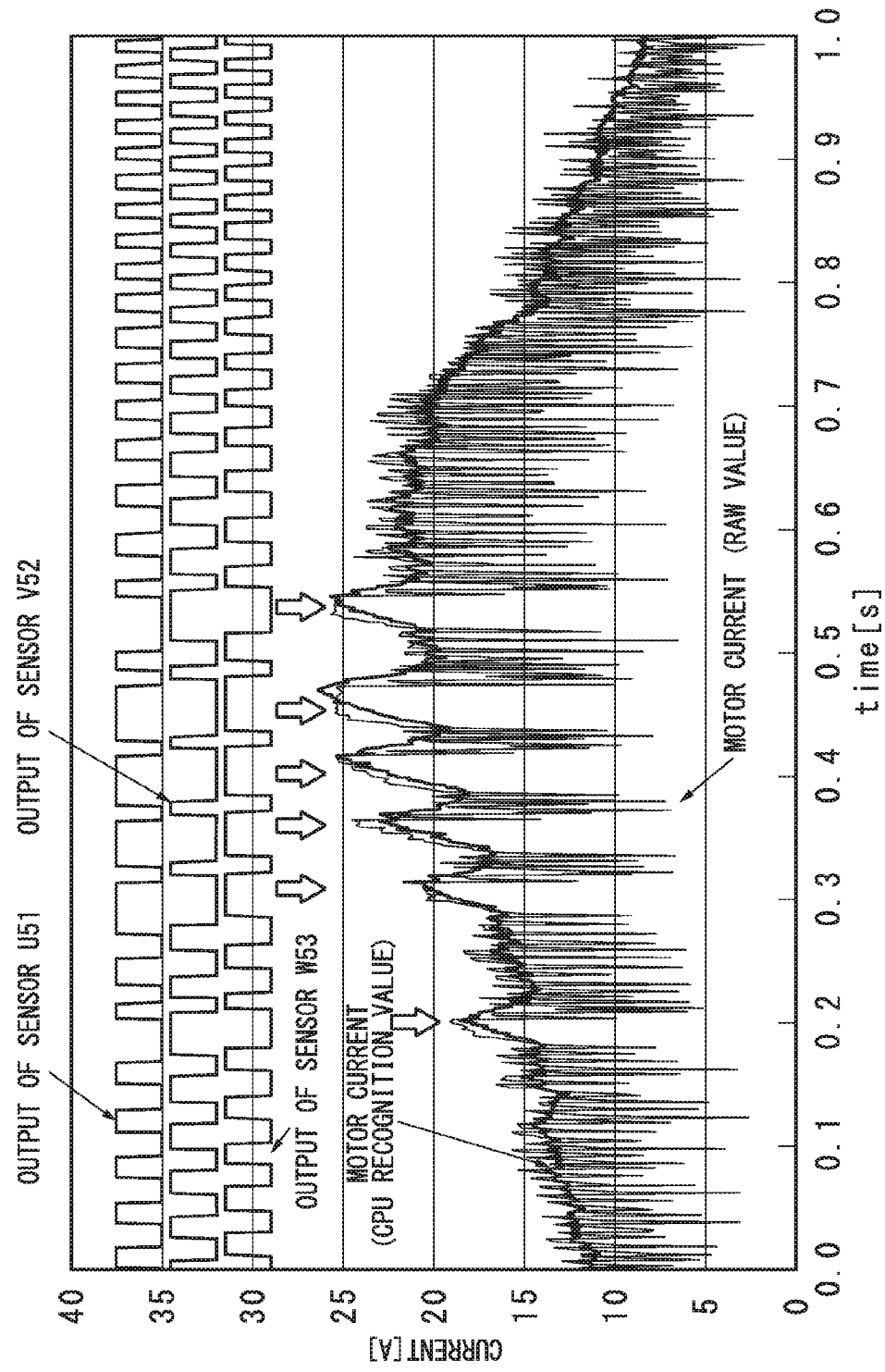
FIG. 6 is an explanatory view showing an example of an operation in a case where advance angle adjustment of the present invention is not performed.
Figure 7:
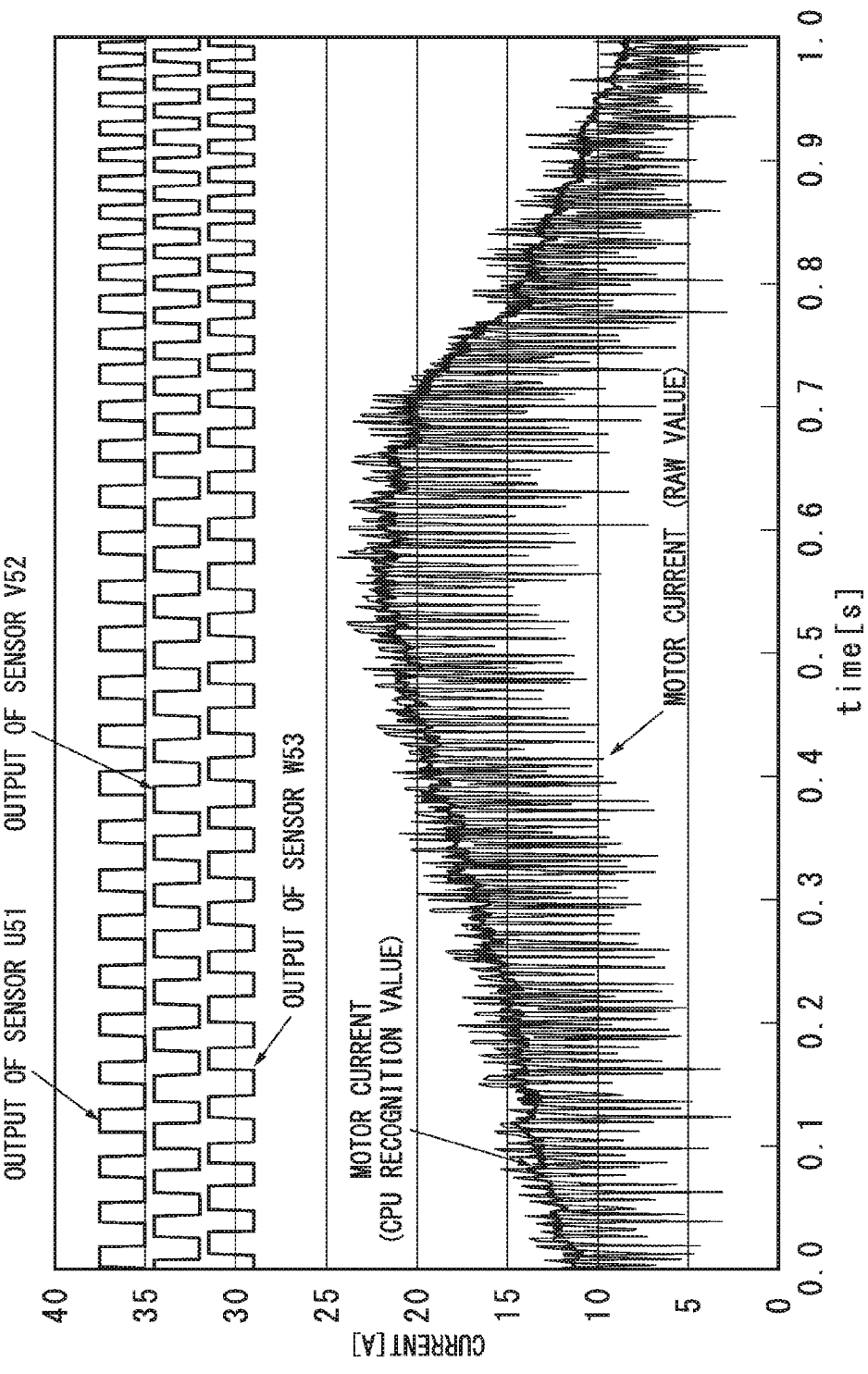
FIG. 7 is an explanatory view showing an example of an operation in a case where the advance angle adjustment of the present invention is performed.

Examples of the waveforms of the sensors output and the waveforms of motor current under a high load are shown in FIGS. 6 and 7, for a case where advance angle adjustment is not performed (FIG. 6) and for a case where advance angle adjustment with an electrical angle of 30 degrees is performed (FIG. 7). The horizontal axis represents time, and the vertical axis represents current. Here, the sensor waveform is a waveform in a high level or a low level. "Motor current (raw value)" is a value obtained by amplifying the output voltage of the shunt resistor as it is. On the other hand, "motor current (CPU recognition value)" is plotted a value obtained by allowing the same waveform to pass through a low-pass filter and thereafter A/D conversion by the CPU is performed thereon. The waveform of the "motor current (raw value)" shows spike noises because the energization patterns are switched at switching timings of the sensors. The spike noises may be easily reduced by the low-pass filter. In a case where the advance angle adjustment is not performed, it is known that rotation unevenness and current unevenness caused by pulsation of the motor under a high load as indicated by arrows in FIG. 6 are not entirely removed by the filter because the frequency of the current is low. Contrary to this, in a case where the advance angle adjustment is performed, as shown in FIG. 7, it is known that rotation unevenness and current unevenness caused by pulsation of the motor under a high load such as indicated by arrows in FIG. 6 are reduced.

According to the embodiment of the present invention described above, the plurality of sensors are disposed to be shifted by predetermined electrical angles, and the energization state of the motor during counterclockwise rotation is controlled by using the counterclockwise pattern corresponding to the outputs of the plurality of sensors and a predetermined shift in the electrical angle. For example, when the shift in the electrical angle is set to reduce current unevenness in the vicinity of lock current as much as possible, current unevenness in the vicinity of the lock current can be reduced. Therefore, in this case, catching detection in the vicinity of the lock current can be performed with higher accuracy.

In addition, since the motor is the brushless motor provided with the permanent magnet rotor having the plurality of magnetic poles and the stator having the stator coils as multi-phase armature windings, a reduction in thickness and an increase in the lifetime due to the absence of brushes can be easily achieved.

In addition, since the predetermined electrical angles by which the plurality of sensors are shifted are set with respect to the center of the stator coils included in the motor as a basis, the plurality of sensors can be easily disposed together in a narrow range.

In addition, the motor is the brushless motor with the 16 poles and the 18 slots, the 18 coils are wound in each of the slots as concentrated windings, a single phase group is formed of three adjacent coils, and the center of the stator coils is set to be positioned in the middle of the single phase group formed of the three adjacent coils. Therefore, the disposition of the plurality of sensors easily enables the sensors to be disposed together in a narrow range compared to, for example, a case of disposing the sensors between the phase groups. In addition, in this configuration, the plurality of sensors can be disposed in a range of a mechanical angle of 30 degrees.

In addition, since the predetermined shift in the electrical angles is set to a value that reduces pulsation of the motor under a high load, it is possible to reduce current variations at a low frequency, which tends to be significant under a high load.

In addition, the embodiment of the present invention is not limited to the above description, and in the above-described embodiment, such modifications, for example, as the units in the CPU 10 in FIG. 1 being integrated or distributed, or a current detection unit provided in the drive circuit 30 being provided instead of the shunt resistor, may be appropriately made.

INDUSTRIAL APPLICABILITY

According to the opening/closing body control device and the opening/closing body control method described above, the plurality of sensors are disposed to be shifted by predetermined electrical angles, and the energization state of the motor during counterclockwise rotation is controlled by using the counterclockwise pattern corresponding to the outputs of the plurality of sensors and a predetermined shift in the electrical angles. For example, when the shift in the electrical angles is set to reduce current unevenness in the vicinity of lock current as much as possible, current unevenness in the vicinity of the lock current can be reduced. Therefore, in this case, catching detection in the vicinity of the lock current can be performed with higher accuracy.

REFERENCE SIGNS LIST

1: opening/closing body control device
11: rotational direction deciding part
12: switching part
13: clockwise pattern storage unit
14: counterclockwise pattern storage unit
15: catching determination part
16: drive command part
40: motor
41, 42, 43: stator coil
44: permanent magnet rotor
51, 52, 53: sensor

What is claimed is:

1. An opening/closing body control device configured to control driving of opening and closing of an opening/closing body using a motor, the device comprising:
   catching determination part configured to determine whether or not a catching in the opening/closing body has occurred based on a value of current that flows in the motor;
   a plurality of sensors which are disposed to be shifted by predetermined electrical angles and are configured to detect positions of magnetic poles of the motor;
   a drive circuit configured to switch an energization state of the motor;
   rotational direction determination part configured to generate a rotational direction signal indicating clockwise rotation or counterclockwise rotation of the motor;
   a clockwise pattern storage unit which stores a clockwise pattern which is a switching pattern for switching an energization state of the drive circuit according to outputs of the plurality of sensors and which is used when the motor is rotated clockwise;
   a counterclockwise pattern storage unit which stores a counterclockwise pattern which is a switching pattern for switching the energization state of the drive circuit according to the outputs of the plurality of sensors and a predetermined shift in the electrical angles and which is used when the motor is rotated counterclockwise;
   switching part configured to read either the clockwise pattern or the counterclockwise pattern from the clockwise pattern storage unit or the counterclockwise pattern storage unit based on the rotational direction signal, being output from the rotational direction determination part; and
   drive command part configured to control the drive circuit using the clockwise pattern or the counterclockwise pattern output from the switching part based on the outputs of the plurality of sensors, and in a case where the catching determination part determines that a catching has occurred, configured to control the drive circuit in a predetermined pattern for eliminating the catching.

2. The opening/closing body control device according to claim 1,
   wherein the motor is a brushless motor provided with a permanent magnet rotor having a plurality of magnetic poles and a stator having stator coils as multi-phase armature windings.

3. The opening/closing body control device according to claim 2,
   wherein the predetermined electrical angles by which the plurality of sensors are disposed to be shifted are set with respect to a center of the stator coils included in the motor as a basis.

4. The opening/closing body control device according to claim 3,
   wherein the motor is a brushless motor with 16 poles and 18 slots,
   18 coils are wound in each of the slots as concentrated windings, and a single phase group is formed of three adjacent coils; and
   the center of the stator coils is positioned in the middle of a single phase group formed of three adjacent coils.

5. The opening/closing body control device according to claim 4,
   wherein the plurality of sensors are disposed in a range of a mechanical angle of 30 degrees.

6. The opening/closing body control device according to claim 5,
   wherein the predetermined shift in the electrical angles is set to a value that reduces pulsation of the motor under a high load.

7. The opening/closing body control device according to claim 2,
   wherein the predetermined shift in the electrical angles is set to a value that reduces pulsation of the motor under a high load.

8. The opening/closing body control device according to claim 3,
   wherein the predetermined shift in the electrical angles is set to a value that reduces pulsation of the motor under a high load.

9. The opening/closing body control device according to claim 4,
   wherein the predetermined shift in the electrical angles is set to a value that reduces pulsation of the motor under a high load.

10. The opening/closing body control device according to claim 1,
    wherein the predetermined electrical angles by which the plurality of sensors are disposed to be shifted are set with respect to a center of the stator coils included in the motor as a basis.

11. The opening/closing body control device according to claim 10,
    wherein the motor is a brushless motor with 16 poles and 18 slots,
    18 coils are wound in each of the slots as concentrated windings, and a single phase group is formed of three adjacent coils; and
    the center of the stator coils is positioned in the middle of a single phase group formed of three adjacent coils.

12. The opening/closing body control device according to claim 11,
    wherein the plurality of sensors are disposed in a range of a mechanical angle of 30 degrees.

13. The opening/closing body control device according to claim 12,
    wherein the predetermined shift in the electrical angles is set to a value that reduces pulsation of the motor under a high load.

14. The opening/closing body control device according to claim 10,
    wherein the predetermined shift in the electrical angles is set to a value that reduces pulsation of the motor under a high load.

15. The opening/closing body control device according to claim 11,
wherein the predetermined shift in the electrical angles is set to a value that reduces pulsation of the motor under a high load.

16. The opening/closing body control device according to claim 1,
wherein the predetermined shift in the electrical angles is set to a value that reduces pulsation of the motor under a high load.

17. An opening/closing body control method of controlling driving of opening and closing of an opening/closing body using a motor, the method comprising:
by using
catching determination part configured to determine whether or not a catching in the opening/closing body has occurred based on a value of current that flows in the motor;
a plurality of sensors which are disposed to be shifted by predetermined electrical angles and are configured to detect positions of magnetic poles of the motor;
a drive circuit configured to switch an energization state of the motor;
rotational direction determination part configured to generate a rotational direction signal indicating clockwise rotation or counterclockwise rotation of the motor;
a clockwise pattern storage unit which stores a clockwise pattern which is a switching pattern for switching an energization state of the drive circuit according to outputs of the plurality of sensors and which is used when the motor is rotated clockwise;
a counterclockwise pattern storage unit which stores a counterclockwise pattern which is a switching pattern for switching the energization state of the drive circuit according to the outputs of the plurality of sensors and a predetermined shift in the electrical angles and which is used when the motor is rotated counterclockwise, and switching part configured to read either the clockwise pattern or the counterclockwise pattern from the clockwise pattern storage unit or the counterclockwise pattern storage unit based on the rotational direction signal, being output from the rotational direction determination part, controlling the drive circuit using the clockwise pattern or the counterclockwise pattern output from the switching part based on the outputs of the plurality of sensors, and in a case where the catching determination part determines that a catching has occurred, controlling the drive circuit in a predetermined pattern for eliminating the catching.

* * * * *